(12) United States Patent
Fukushima et al.

(10) Patent No.: US 7,710,272 B2
(45) Date of Patent: *May 4, 2010

(54) RADIO FREQUENCY IDENTIFICATION (RFID) DEVICE WITH A RESPONSE STOP COMMAND

(75) Inventors: Shinichiro Fukushima, Yokohama (JP); Yutaka Takami, Yokohama (JP); Masumi Moritani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/196,768

(22) Filed: Aug. 22, 2008

(65) Prior Publication Data

US 2008/0316034 A1  Dec. 25, 2008

Related U.S. Application Data

(63) Continuation of application No. 11/389,537, filed on Mar. 27, 2006, now Pat. No. 7,425,897.

(30) Foreign Application Priority Data

Mar. 28, 2005  (JP)  ............................. 2005-090463

(51) Int. Cl.
  *G08B 13/14* (2006.01)
(52) U.S. Cl. ............... 340/572.1; 340/572.3; 340/572.8
(58) Field of Classification Search ............. 340/572.1, 340/572.3, 572.8, 10.5
  See application file for complete search history.

(56) References Cited

U.S. PATENT DOCUMENTS

| | | | |
|---|---|---|---|
| 5,751,223 A | 5/1998 | Turner | |
| 5,842,118 A | 11/1998 | Wood, Jr. | |
| 6,025,780 A | 2/2000 | Bowers et al. | |
| 6,104,281 A | 8/2000 | Heinrich et al. | |
| 6,232,870 B1 | 5/2001 | Garber et al. | |
| 6,520,544 B1 | 2/2003 | Mitchell et al. | |
| 6,646,554 B1 | 11/2003 | Goff et al. | |

(Continued)

FOREIGN PATENT DOCUMENTS

EP  1 538 556  6/2005

(Continued)

OTHER PUBLICATIONS

"Technical Report, 860MHz-930MHz Class I Radio Frequency Identification Tag Radio Frequency & Logical Communication Interface Specification Candidate Recommendation, Version 1.0.1" MIT-AUTOID-TR-007, Nov. 14, 2002, pp. 1-17.

(Continued)

*Primary Examiner*—John A Tweel, Jr.
(74) *Attorney, Agent, or Firm*—McDermott Will & Emery LLP

(57)  ABSTRACT

An RFID device is capable of stopping and restarting a response via a response stop command. The device is capable of initializing a part of or the whole of internal data including a response restart set data storage portion. The device is capable of using command data from an external communication equipment to look up response restart data at the restart of a response, deciding a data storage area and content that may be initialized when the restart is possible, and rewriting a data storage portion.

4 Claims, 3 Drawing Sheets

U.S. PATENT DOCUMENTS

| | | | |
|---|---|---|---|
| 6,788,205 B1 | 9/2004 | Mason et al. | |
| 6,933,848 B1 | 8/2005 | Stewart et al. | |
| 7,109,867 B2 | 9/2006 | Forster | |
| 7,425,897 B2 * | 9/2008 | Fukushima et al. | 340/572.1 |
| 2002/0135478 A1 | 9/2002 | Stegmaier et al. | |

FOREIGN PATENT DOCUMENTS

| | | |
|---|---|---|
| EP | 1 587 001 | 10/2005 |

OTHER PUBLICATIONS

Search Report dated Jul. 14, 2006.

European Office Action issued in European Patent Application No. EP 06 251 640.6, dated on Jan. 24, 2008.

* cited by examiner

CONSTRUCTION OF DATA STORAGE PORTION

FIG.4

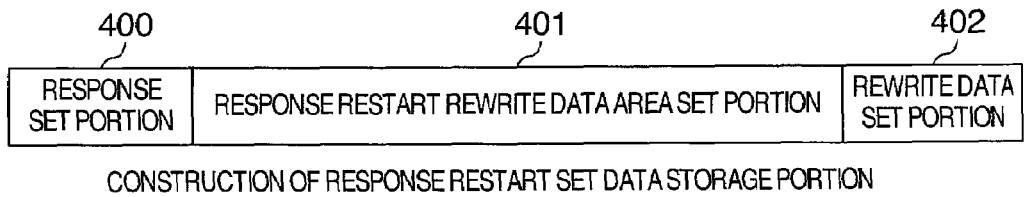

| 400 | 401 | 402 |
|---|---|---|
| RESPONSE SET PORTION | RESPONSE RESTART REWRITE DATA AREA SET PORTION | REWRITE DATA SET PORTION |

CONSTRUCTION OF RESPONSE RESTART SET DATA STORAGE PORTION

FIG.5

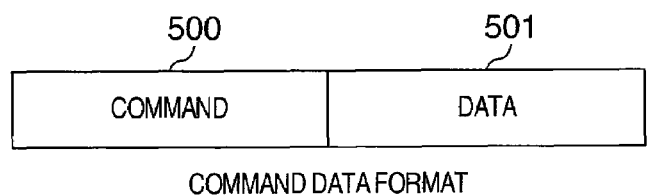

| 500 | 501 |
|---|---|
| COMMAND | DATA |

COMMAND DATA FORMAT

FIG.6

COMMAND DATA TABLE

| 601 COMMAND VALUE | 602 COMMAND MEANING | 603 DATA VALUE | 604 DATA MEANING |
|---|---|---|---|
| 10 | RESPONSE STOP | 00 | RESPONSE IS STOPPED. |
| 11 | RESPONSE RESTART | 00 | RESPONSE IS RESTARTED. |
| 12 | RESPONSE RESTART SETTING | 00 | RESPONSE RESTART IS NOT POSSIBLE. |
| | | 01 | RESPONSE IS RESTARTED WHILE ALL DATA ARE HELD. |
| | | 02 | RESPONSE IS RESTARTED BY INITIALIZING ALL DATA. |
| | | 03 | RESPONSE IS RESTARTED BY INITIALIZING ONLY ID DATA PORTION. |
| | | 04XX | RESPONSE IS RESTARTED BY REWRITING ALL DATA TO "XX". |
| | | 05XX | RESPONSE IS RESTARTED BY REWRITING ONLY ID DATA PORTION TO "XX". |
| | | 06XXX··· | DATA REWRITE AREA IS SET TO XXX… |
| ⋮ | ⋮ | ⋮ | ⋮ |

600

RADIO FREQUENCY IDENTIFICATION (RFID) DEVICE WITH A RESPONSE STOP COMMAND

CLAIM OF PRIORITY

The present application is a Continuation of U.S. application Ser. No. 11/389,537, filed Mar. 27, 2006, now U.S. Pat. No. 7,425,897, and claims priority from Japanese patent application No. JP 2005-090463 filed on Mar. 28, 2005, the entire contents of each of which hereby incorporated by reference into this application.

BACKGROUND OF THE INVENTION

This invention relates to RFID (Radio Frequency Identification) and mounted chips. Non-contact IC cards and non-contact IC modules are also a kind of the RFID.

Studies have been made in recent years for managing or tracing all goods by bonding RFID devices to them.

Various advantages may be given to the managing side if the goods become traceable but purchasers of the goods may feel reluctant to tracing once they purchase the goods with the RFID. Therefore, the functions of the RFID can be stopped in the RFID of the latest type. For example, the following reference discloses a "KILL" command capable of permanently stopping the functions of the RFID:

Auto-ID Center technical report 860 MHz-930 MHz Class I Radio Frequency Identification Tag, Radio Frequency & Logical Communication Interface Specification Candidate Recommendation, Version 1.0.1 Published Nov. 14, 2002. Distribution restricted to Sponsors until Nov. 14, 2002. MIT-AUTOID-TR-007 (P6)

SUMMARY OF THE INVENTION

However, the RFID device becomes unusable once its response is stopped. The RFID device that is expected to be mass-produced in future is preferably re-utilizable. When the response of the RFID device the response of which is stopped is simply restarted under the same condition as before the stop, the goods may be again traced from the ID and the original aim cannot be achieved.

To this end, a system that compulsively initializes the ID at the restart of response may be introduced. Needless to say, whether or not the restart of the response is made can be preferably decided depending on the condition of use and data other than ID may be contained in some cases. More desirably, therefore, which data should be initialized and which data should be left as such can be set at the stop of the response. In these cases, this setting is preferably made by only authenticated parties.

It is an object of the invention to provide an RFID capable of restarting a response by initializing (changing) the whole or a part of internal data by setting in an RFID capable of stopping and restarting the response.

To accomplish the object described above, the invention arranges inside a data storage area an area that is initialized at the restart of the response and an area that is not initialized and in this way, the invention can initialize the whole or a part of data at the restart of the response.

In the invention, there is disposed a response restart set data storage portion. At the restart of the response, the RFID looks up the response restart data, judges whether or not the restart can be made, decides the data storage area that may be initialized and its content when the response can be restarted, and rewrites the data storage portion, so that control of the restart of the response and initialization of a specific area can be made.

In the invention, an authentication processing is executed when a response restart set command or a response restart command is received. Consequently, setting of the response restart and the restart of the response can be made while security is insured.

In RFID capable of stopping and restarting the response, the invention can provide an RFID capable of restarting the response by initializing either the whole or a part of internal data by setting.

Other objects, features and advantages of the invention will become apparent from the following description of the embodiments of the invention taken in conjunction with the accompanying drawings.

BRIEF DESCRIPTION OF THE DRAWINGS

FIG. 4 shows an example of a construction of a set data storage portion at the time of restart of a response according to an embodiment of the invention;

FIG. 5 shows an example of a command data format according to an embodiment of the invention;

FIG. 6 shows an example of a value of a command data and its meaning according to an embodiment of the invention;

DESCRIPTION OF THE EMBODIMENTS

Embodiments of the invention will be hereinafter explained with reference to the accompanying drawings.

Figure 1:
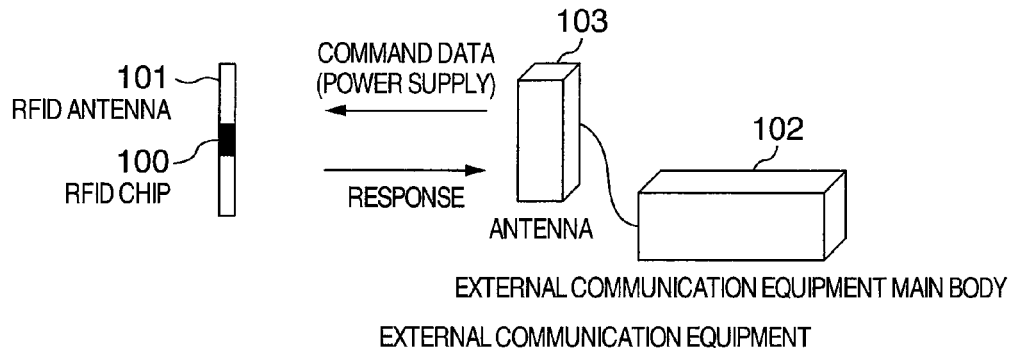
FIG. 1 shows an example of a construction of RFID and a construction of external communication equipment according to an embodiment of the invention.

FIG. 1 shows a construction of an RFID system including RFID and external equipment according to an embodiment of the invention. The RFID can be broadly divided into an RFID chip 100 and an RFID antenna 101 and the external communication equipment includes an external equipment main body 102 and an antenna 103. The supply of electric power and transmission of command data are made to the RFID and the external equipment receives a reflection wave with which response data from the RFID is superposed to receive response data from the RFID.

Figure 2:
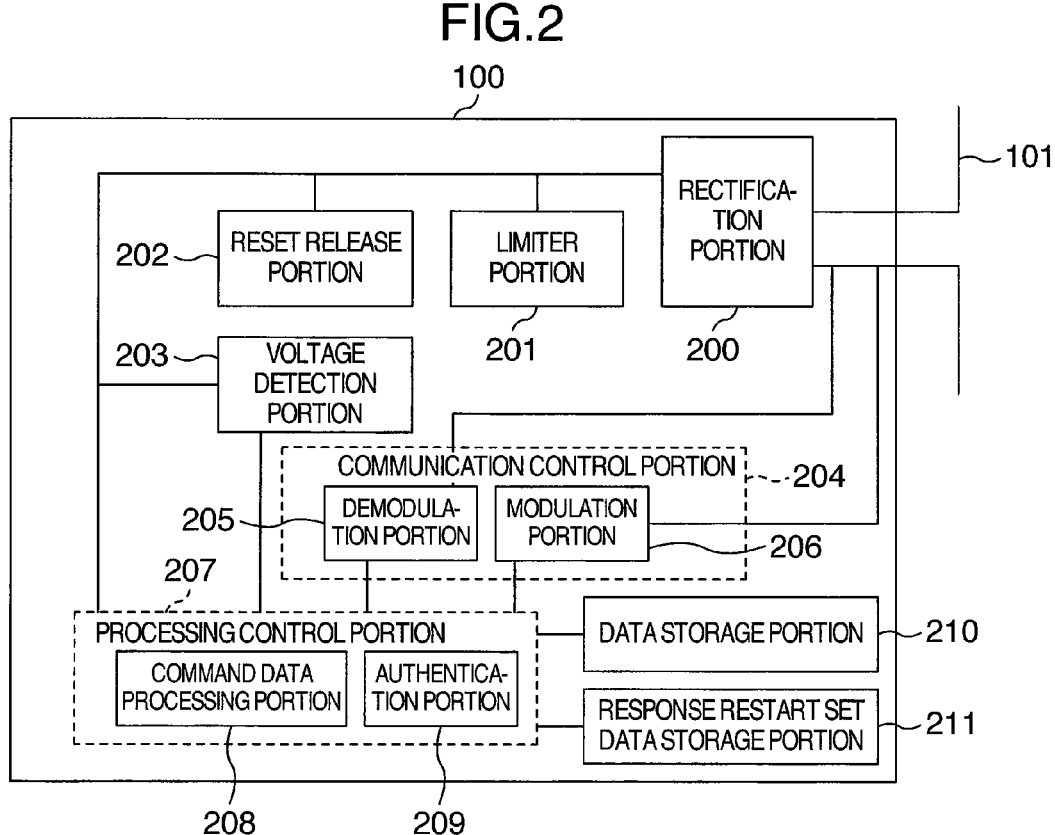
FIG. 2 shows an example of an internal construction of an RFID chip.

FIG. 2 shows a main construction of the RFID.

The RFID 100 includes an antenna 101 for executing transmission and reception of command data with the external equipment, a rectification circuit 200 for rectifying a radio wave received from the antenna 101, a limiter 201 for protecting the RFID chip from an overvoltage, a reset release portion 202 for releasing a reset state of the chip, a voltage detection portion 203 for detecting a voltage value obtained by rectification, a communication control portion 204 including a demodulation portion 205 for demodulating the received command data associated with data transmission and reception and a modulation portion 206 for modulating data to be transmitted, a processing control portion 207 including a command data processing portion 208 for processing command data and an authentication portion 209 for executing various kinds of authentication processing, a data storage portion 210 for storing ID and user data, and a response restart set data storage portion 211 for storing various kinds of set data at the restart of response.

Figure 3:
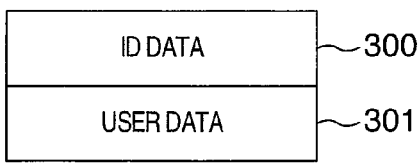
FIG. 3 shows an example of a construction of a data storage portion.

FIG. 3 shows an example of a construction of the data storage portion 203.

The data storage portion includes an ID data storage portion 300 for storing ID data and a user data storage portion 301 for storing user data. Needless to say, only the ID data portion may be provided depending on RFID or ID and the user data may be stored without discrimination.

An area that is essentially initialized at the restart of the response may be set either partially or wholly though the degree of freedom drops. It may be further possible to prepare a system area and to store the data of the issuance date of the RFID or counter data representing the number of times of the stop of response and feasibility of response restart may be controlled by such data.

FIG. 4 shows an example of a construction of the response restart set data storage portion 211.

Response restart set data is a portion for storing various kinds of set data for the restart of the response. The RFID judges on the basis of this set data whether or not the restart of the response is possible, or whether or not the ID data and the user data stored are to be initialized or to be left as such.

The response restart set data storage portion 211 includes a response set portion 400 for setting data of permission/inhibition of the restart of the response after the stop of the response, a rewrite data area 401 at the time of response restart, for storing the rewrite data area at the time of the restart of the response and a data area set portion 402 for storing the data content to be rewritten.

In the response permission portion, permission/inhibition may be represented by 1-bit flag, for example, or a longer data length may be prepared and provided with significance. As for the rewrite data area set portion for the restart of the response, a data length flag sufficient to represent a minimum rewrite unit of the data storage portion may be prepared to judge whether or not to execute rewrite by ON/OFF of the flag. A data length of the minimum rewrite unit is prepared, and the data that is set there is the value that is set at the time of initialization.

This response restart set portion may of course be stored in the command data processing portion 208 or in the data storage portion 210. In the case of the RFID in which the area essentially initialized at the restart of the response is set either partially or wholly and the set data is not particularly required, this response restart data storage portion need not particularly be provided.

FIG. 5 shows an example of a command data format transmitted from the external communication equipment to the RFID. The command data has a command portion 500 and a data portion 501. A command for a tag is put to the command 500 and a value necessary for each command is set to the data 501.

FIG. 6 shows an example of a part of command data associated with the stop and restart of the response.

A command data table 600 includes a command value 601, a command meaning 602, a data value 603 and meaning 604 of the data value. The meaning of the case of the command value "10" and the data value "00", for example, is the stop of the response. This command is transmitted by the external communication equipment 102 through the antenna 103 and when the RFID correctly receives the command, the tag stops the response.

The meaning of the case of the command value "11" and the data value "00" is the restart of the response. When the restart of the response is permitted, the response is restarted after this command is received.

The meaning of the case of the command value "12" is a variety of setting at the restart of the response. The data value takes the value of "00" to "06". When the data value is "00", the restart of the response is not permitted. In this case, the RFID cannot restart the response and cannot permanently restart the response once the response is stopped.

When the data value is "01", the response is restarted while all the data are retained. In this case, the RFID can restart the response under the same condition as the response stop.

When the data value is "02", all the data are initialized and the response is restarted. In this case, because the RFID initializes the ID and the user data, the trace by using the previous ID data cannot be made.

When the data value is "03", the response is restarted by initializing only the ID data portion. In this case, the RFID holds the user data and initializes only the ID.

When the data value is "04", all the data are initialized by the data indicated by "XX".

When the data is "05", only the ID data portion is initialized by the data indicated by "XX".

When the data is "06", the data rewrite area is indicated by "XXX . . . ". It is possible, for example, to initialize only a part of the ID data.

The command length, the data length and meaning of the respective values are of course different depending on the RFID system used.

It is also possible to use a command that gathers the response stop command and the data storage portion change set command at the restart of the response into one unit or a command that divides more discretely the data storage portion change set command at the restart of the response.

Next, the explanation will be given as to how the RFID sets the response restart set data, how it receives the response re-start command and how it changes the data storage portion and restarts the response when receiving the response restart command.

Figure 7:
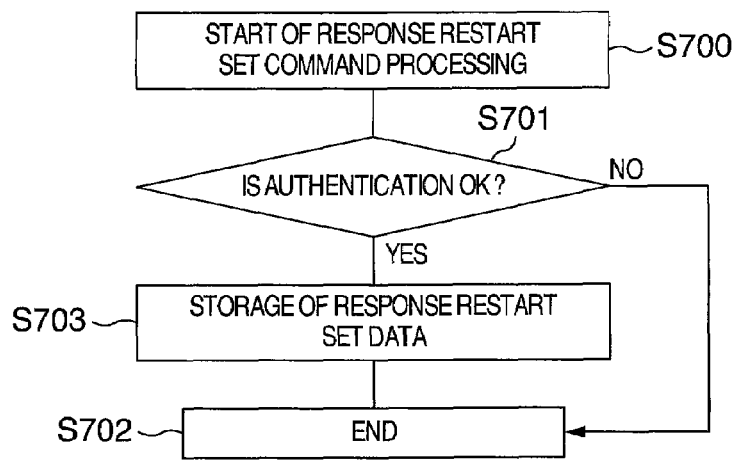
FIG. 7 shows an example of a flow of a storage processing of response restart set data used for restarting the response by a response restart set command according to an embodiment of the invention.

FIG. 7 shows a flow example representing how the response restart set command data transmitted from the external communication equipment main body 102 is processed by the command data processing portion 207.

First, when the response restart set command reaches the command data processing portion 207, the processing of Step S700 is started and the flow proceeds to Step S701. Whether or not an authentication processing is made is checked in Step S701. When authentication is not OK, the flow proceeds to Step S702 and the processing is completed. When authentication is OK, the flow proceeds to Step S703. In this Step S703, response restart set data is stored in the response restart set data storage portion 211. The flow proceeds to Step S702 and the processing is completed.

Various kinds of authentication are available such as the authentication that uses a password, one-side authentication processing using a cipher or a random number, a mutual authentication processing, authentication processing by signed data, and any authentication system may be employed. An economical RFID not having the authentication portion may be conceivable and the RFID need not always have the authentication portion.

Figure 8:
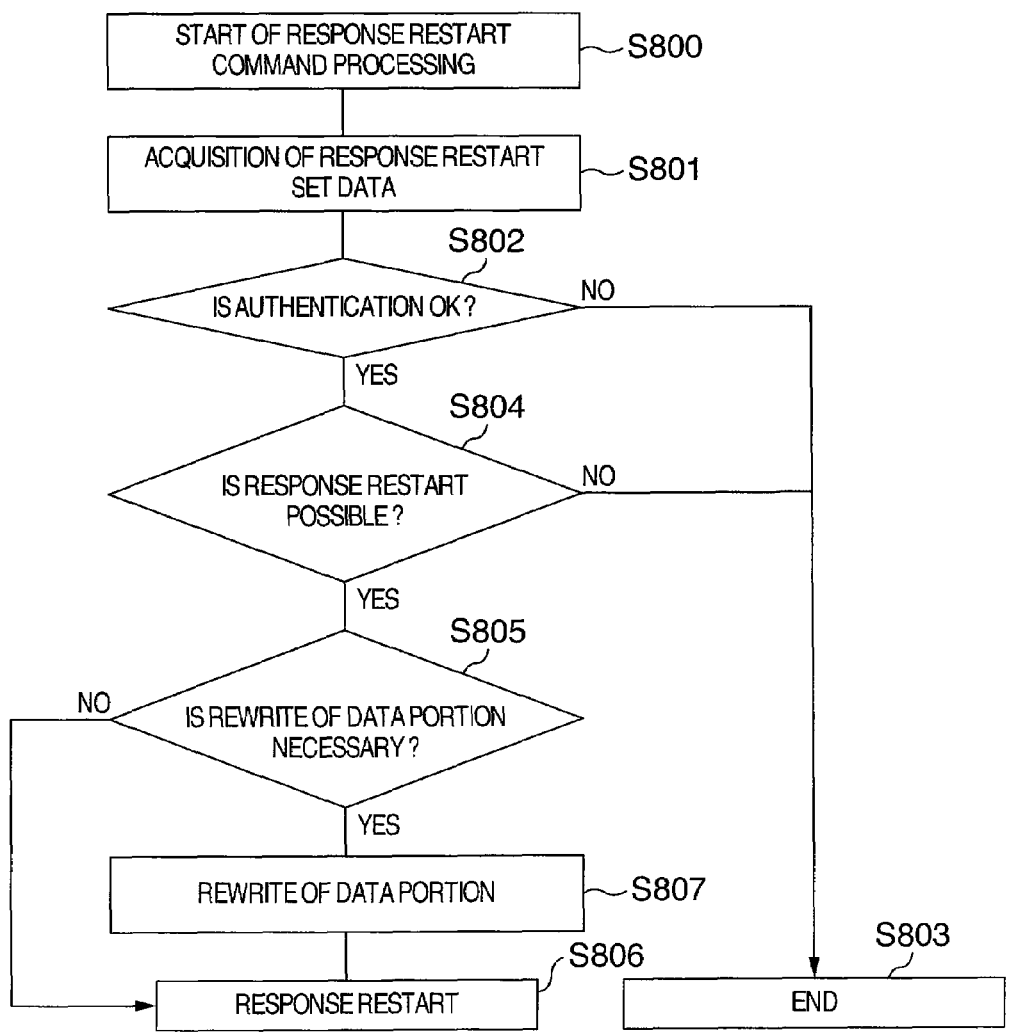
FIG. 8 shows an example of a flow of a data rewrite processing by a response restart command according to an embodiment of the invention.

FIG. 8 shows a flow example representing how the response restart command data transmitted from the external communication equipment main body 102 is processed in the command data processing portion 207.

First, when the response restart command reaches the command data processing portion 207, the processing of Step S800 is started and the flow proceeds to Step S801. In this Step S801, the data of the response restart set data storage portion is read out and the flow proceeds to Step S802. Whether or not authentication has already been made is checked in Step S802. The flow proceeds to Step S803 when authentication is not OK and the processing is completed. When authentication is OK, the flow proceeds to Step S804.

In Step S804, the flow proceeds to Step S803 and the processing is completed when the restart of the response is judged as impossible by the data of the response set portion 400. When the restart of the response is possible, the flow proceeds to Step S805. In Step S805, whether or not rewrite of the data of the data storage portion is necessary is judged and when rewrite is judged as necessary, to which data of the data storage portion should be rewritten is judged from the rewrite data area set portion 401 at the restart of the response and from the rewrite data set portion 402. When rewrite of the data is not necessary, the flow proceeds to Step S807. In Step S807, the ID and the user data are rewritten by the data indicated and the flow proceeds to Step S806.

Incidentally, the data rewrite processing when the response restart command is received is executed in this flow example but data rewrite may be made when the response stop command is received.

In this flow example, too, the authentication portion need not always be disposed.

In this embodiment, the explanation has been made on the assumption that the same function as that of the response stop is maintained at the restart of the response with the exception of the change of the data storage portion, but an RFID capable of making only a response representing that the response is stopped may be used, for example. An area for the control of such functions may be arranged in the response restart set data storage portion.

The present invention can be applied to an RFID module besides the RFID. The invention can likewise be applied to non-contact IC cards and IC card modules. Needless to say, the invention can be applied to all of RFID chip discrete bodies, RFID inlets and RFID tags.

As described above, in the RFID capable of the stopping and restarting the response, the invention can provide an RFID capable of restarting the response by initializing either a part or the whole of internal data by setting.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio frequency identification (RFID) chip, comprising:
   a communication control portion for receiving a command and data from external communication equipment;
   a processing control portion for processing the command and data received in the communication control portion; and
   a data storage portion for storing data, wherein:
   the command is a predetermined command associated with stopping the operation of the RFID chip, and
   upon receipt of predetermined data together with the command, the processing control portion is operable to change a content of the data storage portion, wherein the content corresponds to the predetermined data received.

2. The RFID chip according to claim 1, wherein only a part of the content of the data storage portion is changed.

3. The RFID chip according to claim 1, wherein the data storage portion includes an area where data is changeable and an area where data is unchangeable.

4. The RFID chip according to claim 1, wherein data stored in the data storage portion includes an ID.

* * * * *